Aug. 27, 1957
R. MARPLE
2,803,955
LATCHING MECHANISM
Filed Nov. 1, 1954.
4 Sheets-Sheet 1
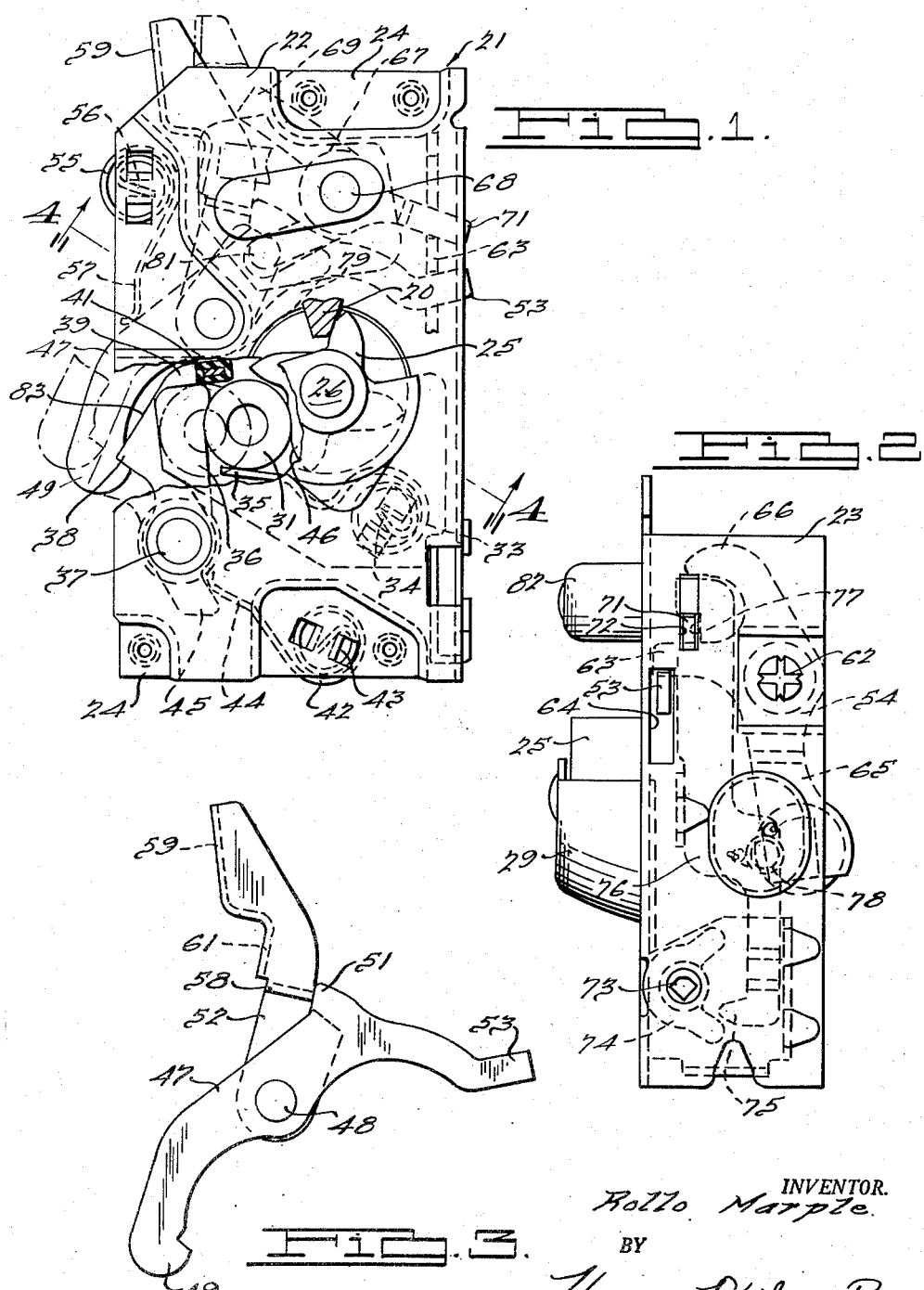
INVENTOR.
Rollo Marple.
BY
Harness, Dickey & Pierce
ATTORNEYS

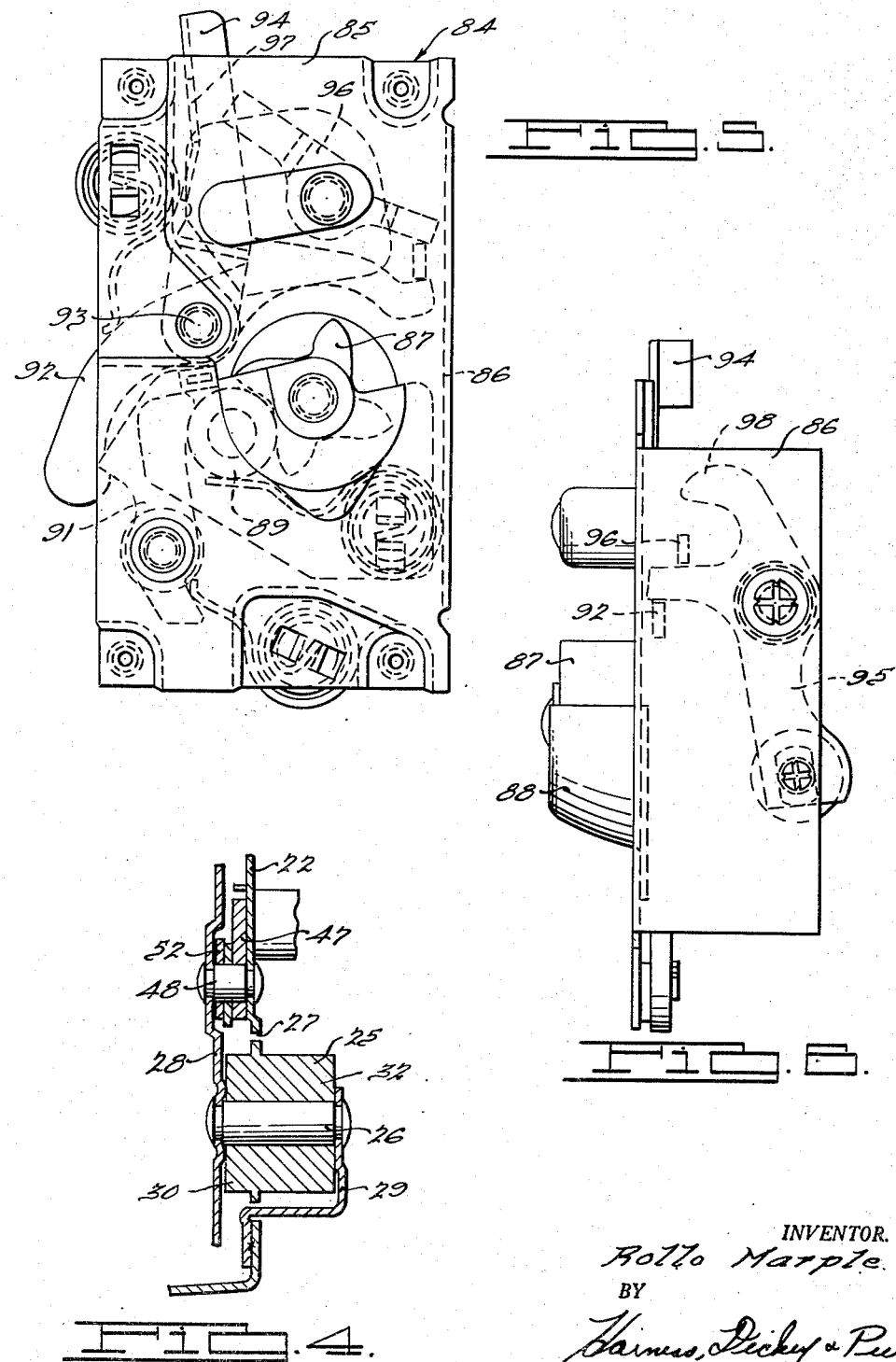

Aug. 27, 1957  R. MARPLE  2,803,955
LATCHING MECHANISM
Filed Nov. 1, 1954  4 Sheets-Sheet 3
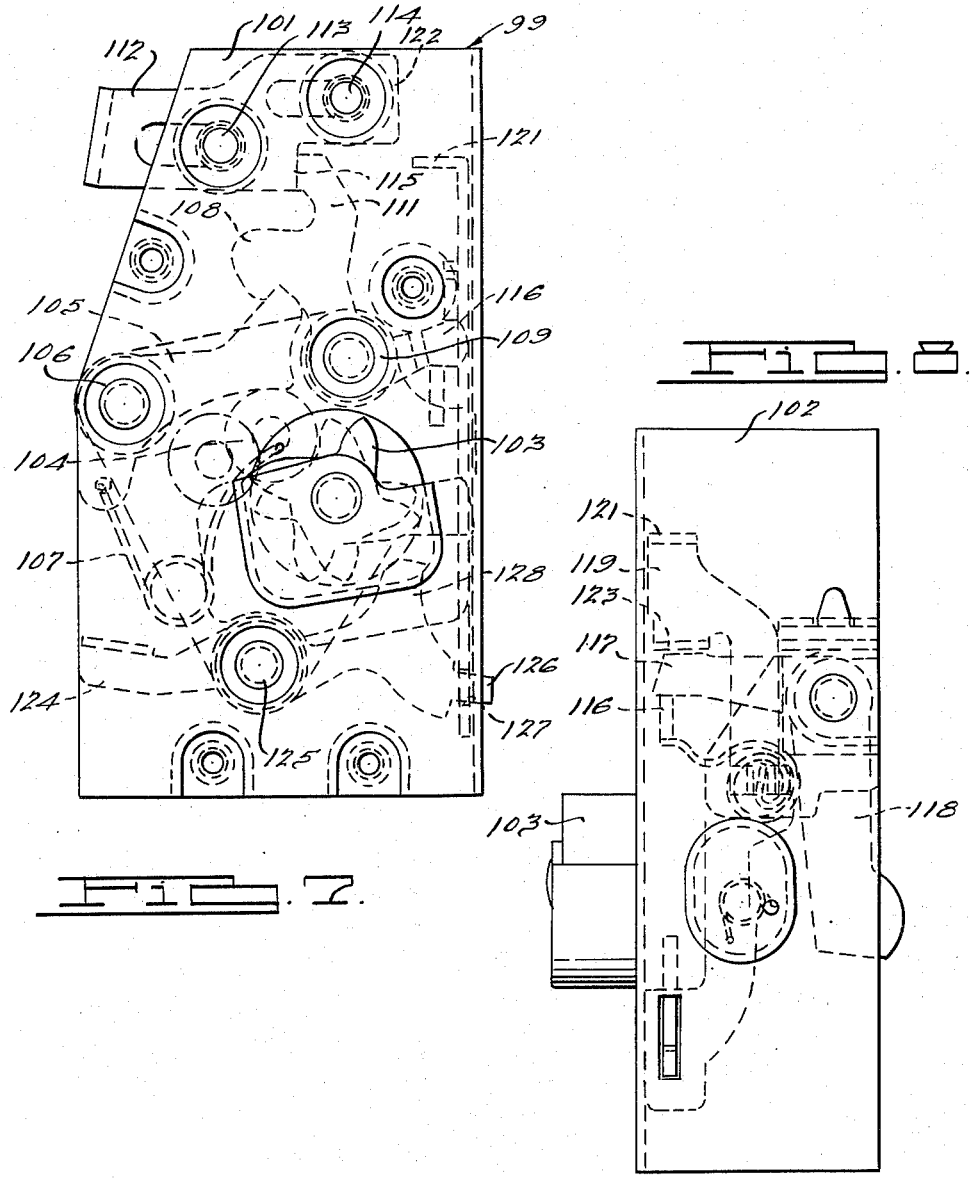
INVENTOR.
Rollo Marple.
BY
Harness, Dickey & Pierce
ATTORNEYS Aug. 27, 1957 R. MARPLE 2,803,955
LATCHING MECHANISM
Filed Nov. 1, 1954 4 Sheets-Sheet 4
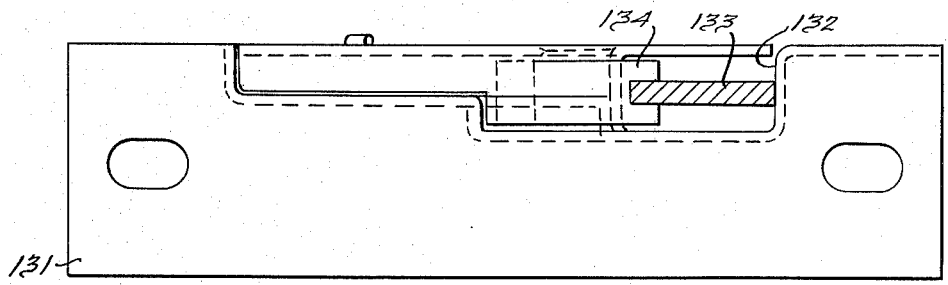
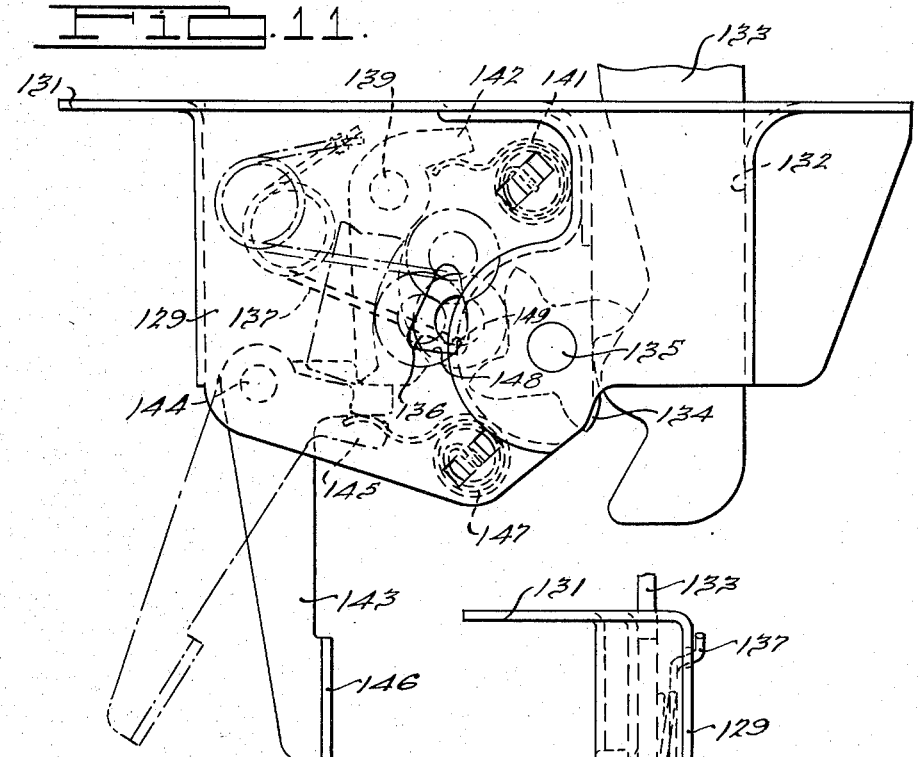
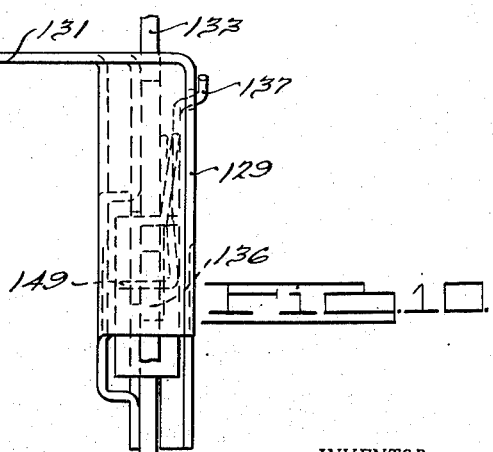
INVENTOR.
*Rollo Marple.*
BY
*Harness, Dickey & Pierce*
ATTORNEYS.

United States Patent Office 2,803,955
Patented Aug. 27, 1957

2,803,955

LATCHING MECHANISM

Rollo Marple, Jackson, Mich., assignor to Hancock Manufacturing Company, Jackson, Mich., a corporation of Michigan Application November 1, 1954, Serial No. 465,901

20 Claims. (Cl. 70—135)

This invention relates to latching mechanisms, and more particularly to latches for use with automotive vehicles and in other installations where the latch is subject to jarring and vibration. This application is related to applicant's copending application Serial No. 218,447 filed March 30, 1951, now Patent No. 2,712,957 issued July 12, 1955.

It is an object of this invention to provide an improved latch mechanism which insures a firm connection despite variations in assembly and vibration and jarring of the parts.

It is another object to provide a latch of this type which permits the closure to be shut and latched easily, and at the same time permits release of the latching mechanism with a minimum of effort by the operator. More particularly, it is an object to provide an improved latch of the above character, in which a continuous "take-up" or wedging action is applied to the bolt when in its latching position, but wherein the latch release operation does not require forcing of the wedging member from its take-up position.

It is a further object, in several embodiments of this invention, to provide a door latching and locking mechanism which incorporates the above principles of construction and combines them with other elements to form an assembly capable of installation and use with conventional automotive arrangements for both front and rear doors, using either pivoted or sliding outside rollbacks.

It is another object, in one form of the invention, to provide hood latching mechanism for automotive vehicles which incorporates the above stated principles of take-up action and ease of release, these principles being combined in an assembly of compact construction.

Other objects, features, and advantages of the present invention will become apparent from the subsequent description, taken in conjunction with the accompanying drawings.

In the drawings:

Figure 1 is a front elevational view, parts being broken away for clarity, of a door latching and locking mechanism involving the principles of this invention, showing the base portion of the mounting plate, the latch having a pivoted outside rollback;

Figure 2 is a side elevational view of the embodiment of Figure 1, showing the inside rollback and locking slide;

Figure 3 is a detailed elevational view of the outside rollback and catch showing the cooperative engagement of these parts;

Figure 4 is a cross-sectional view taken along the line 4—4 of Figure 1 and showing the deck plate and pivot supports;

Figure 5 is a front elevational view of another embodiment of this invention especially adapted for rear automobile doors, showing the base portion of the mounting plate and its attendant parts;

Figure 6 is a side elevational view of the embodiment of Figure 5 showing the inside rollback;

Figure 7 is an end elevational view of still another embodiment of the invention incorporating a slidable outside rollback;

Figure 8 is an end elevational view of the embodiment of Figure 7, showing the locking slide and inside rollback;

Figure 9 is a side elevational view of still another embodiment of the invention especially adapted for latching hoods of automotive vehicles, showing the manual release lever and configuration of the keeper;

Figure 10 is an end elevational view of the embodiment of Figure 9 showing the shape of the mounting plate; and Figure 11 is a top plan view of the embodiment of Figures 9 and 10 showing the location of the keeper with respect to the bolt housing.

The invention is especially adapted for latches which include bolts of the rotary multi-toothed type, in which the rotor turns in one direction when closing the door and in the opposite direction when the door is opened. The bolt and its attendant parts are mounted on that portion of the structure which carries the manual release handle or handles. Combined dogging and take-up means are provided for preventing reverse rotation of the bolt after it has engaged the keeper. In the present invention this means takes the form of a disc-shaped roller which rides on a track or cam surface and is engageable with individual teeth of the bolt. Resilient means urges the roller along its track, and the track is so inclined that this roller movement causes the bolt to be wedged in its latching direction of rotation. The track is movably mounted with respect to the bolt and is normally held in its operative position by a catch which engages a portion of the track. When it is desired to unlatch the bolt, the catch is momentarily withdrawn from its normal position by manual means, allowing the track to move to retracted position. The roller is thus no longer held in wedging relation between the bolt and the track, and can be retracted freely upon rotation of the bolt in an unlatching direction by opening the door. Resilient means are provided for returning the track to its normal position in which it is retained by the catch.

The embodiment shown in Figures 1-4 is especially adapted for automobile front doors and comprises a latch mechanism for cooperation with a keeper 20 carried by a stationary pillar. The device comprises an angular mounting plate generally indicated at 21 having a base portion 22 and a flange portion 23 at substantially right angles. Base 22 has upset portions 24 for attachment to the frame of a vehicle door (not shown) so that the latching mechanism will cooperate with keeper 20 which may be of a conventional type. A multi-toothed bolt 25 is rotatably supported by mounting plate 21 for cooperation with the keeper. In particular, bolt 25 is carried by a pin 26 which extends through an aperture 27 in base 22. The ends of pin 26 are supported respectively by a deck plate 28 secured in parallel relation with base 22 and an outboard bearing plate 29 extending through aperture 27, as seen in Figure 4. Bolt 25 has two sets of aligned teeth, an inner set 30 for engagement with a dogging member 31, and an outer set 32 for engagement with keeper 20.

The combined dogging and take-up means 31 for bolt 25 comprises a roller shown as a flat annular member which is disposed adjacent the bolt. A spiral spring 33 has one end 34 secured to base 22 and its outer end 35 engageable with the periphery of roller 31. The arrangement is such that spring 33 continually urges roller 31 in an upward direction as seen in Figure 1.

A track 36 is provided adjacent roller 31 for the purpose of guiding the roller in its proper direction for take-up purposes. Track 36 is pivotally mounted at 37 to base 22 and extends upwardly from the pivot. A shoulder 38 is provided on one side of track 36 for retaining the track in operative position, as later described in detail. The track is also provided with a shoulder 39 engageable with a stop 41 carried by deck plate 28. A spiral spring 42 urges track 36 against stop 41, said stop being positioned so that track 36 will then be in its operative position. Spring 42 has its inner end 43 fixed to base 22 and its outer end 44 engages an extension 45 on track 36.

When in its operative position as shown in solid lines in Figure 1, track 36 has an inclined surface which approaches bolt 25 in an upward direction. A study of Figure 1 will reveal that when spring 33 urges roller 31 upwardly with track 36 in operative position, the roller will be cammed to the right and will engage a tooth 46 of bolt 25, urging the bolt in a counterclockwise or latching direction. Any jarring or vibration will not result in any unlatching movement, since the friction angles between track 36, roller 31 and tooth 46 will prevent dislodgment of the roller. To the contrary, spring 33 will urge roller 31 into a tighter wedging relation upon such vibration, thus taking up any looseness in the latching connection.

If it were desired to unlatch bolt 25 by forcing roller 31 from between track 36 and tooth 46, the operator would have to overcome the substantial frictional forces which are the result of the wedging action of roller 31. The present invention provides a novel means by which such unlatching may be accomplished quickly and easily without the exertion of an excessive force. As shown in Figure 4, this means includes a catch 47 in the form of a lever pivotally mounted at 48 to base 22. The shape of catch 47 is shown in detail in Figure 3, the catch being pivoted at an intermediate portion to base 22.

A hooked portion 49 is provided at one end of catch 47 for engagement with shoulder 38 of track 36. A shoulder 51 is formed at an intermediate portion of catch 47 for engagement by an outside rollback 52 as described below. The opposite end of catch 47 is provided with an arm 53 engageable by an inside rollback 54. A spiral spring 55 has one end 56 fixed to base 22 and its outer end 57 engageable with catch 47 so as to urge the catch in a counterclockwise direction as shown in Figure 1. Spring 55 therefore urges hook 49 into engagement with track 36, as shown in solid lines in Figure 1, so that the latter will be held in its operative position against stop 41. When catch 47 is rotated clockwise into the position shown in dot-dash lines in Figure 1, hook 49 will be withdrawn from shoulder 38, releasing track 36 for counterclockwise rotation into its dot-dash line position.

Outside rollback 52 and inside rollback 54 serve as means for rotating catch 47 into its release position. As shown best in Figure 3, outside rollback 52 is pivotally supported at 48, this pivot being common to members 47 and 52. Rollback 52 extends upwardly and is provided with an offset portion 58 for engagement with shoulder 51 of catch 47. The upper end of rollback 52 is provided with a transverse portion 59 for engagement by a manually operated member (not shown) which may be controlled from the door exterior. A transverse locking surface 61 is also provided at an intermediate portion of rollback 52 for engagement by a locking member as described below.

Inside rollback 54 is pivotally mounted at 62 to flange 23 of the mounting plate. The inside rollback comprises an arm 63 extending toward base 22 and engageable with the upper surface of catch arm 53. A clearance aperture 64 may be provided in flange 23 for arm 53 which extends therethrough. Rollback 54 is also provided with a downwardly extending arm 65 for connection to a remote control linkage (not shown) which may be operated by a manually actuated inside door control. The upper end of rollback 54 has an arm 66 for connection to the locking means described below.

It will be seen that counterclockwise rotation of inside rollback 54 in Figure 2 will cause retracting movement of track 47. It should be observed that the movements of outside rollback 52 and inside rollback 54 are independent of each other, and that either rollback may serve to retract catch 47 regardless of the position or movement of the other rollback. Inside rollback 65 is also rotatable in a clockwise direction from its neutral position shown in Figure 2 to actuate the locking means as described below.

As indicated above, means are provided for locking outside rollback 52 against movement so that the bolt may not be unlatched from the outside. This means comprises a locking member 67 pivoted at 68 to base 22. An arm 69 on member 67 extends in the direction of surface 61 of outside rollback 52. When member 67 is in its unlocking position as shown in dashed lines in Figure 1, arm 69 is above the path of movement of surface 61, permitting outside rollback 52 to move into its dot-dash line position. When member 67 is swung counterclockwise arm 69 will assume the dot-dash line position of Figure 1 and will be in blocking relation with surface 61. Movement of rollback 52 in a direction retracting catch 47 will thereby be prevented.

Manual means operated from inside the door and key actuated means from outside the door are provided for moving locking member 67 between its positions. This means comprises an arm 71 on member 67 extending through a clearance slot 72 in flange 23. Arm 63 of inside rollback 54 is positioned below arm 71 of member 67. When inside rollback 54 is swung in a clockwise direction as seen in Figure 2, arm 63 thereof will engage the underside of arm 71, swinging member 67 into its locking position. A key actuated shaft 73 is carried by flange 23 and supports a forked cam 74. This cam engages the lower projecting end 75 of a locking slide 76 which is slidably carried by flange 23. The upper end of slide 76 has a slot 77 which engages arm 71. An over-center spring 78 is connected between slide 76 and flange 23 so that the slide, and therefore locking member 67, will be held in either its locking or unlocking position.

Means are also provided for moving locking member 67 to its unlocking position when the door is opened by inside rollback 54 or when the door is slammed. This kick-off means includes arm 66 of inside rollback 54 which is positioned above arm 71 of locking member 67. When rollback 54 is rotated in its unlatching direction (counterclockwise as seen in Figure 2) arm 66 will engage arm 71 if locking member 67 is in its locking position. The locking member will thus be rotated clockwise as seen in Figure 1 into its unlocking position. A kick-off member comprising a forked lever 79 is pivoted at 48 and is engageable with an arm 81 on locking member 67. When member 67 is in its locking position, lever 79 is swung clockwise from its position shown in Figure 1, so that its undersurface is engageable by the teeth 30 of bolt 25 when the latter is rotated in a latching direction (counterclockwise in Figure 1). This movement will cause member 79 to rotate in a counterclockwise direction, thereby swinging member 67 into its unlocking position.

*Operation*

In operation of the embodiment of Figures 1–4, it will be assumed that the operator wishes to unlock the door with his key from the outside, enter the car and close and lock the door from the inside. Initially, bolt 25 will be in the position shown in Figure 1, keeper 20 being held between the bolt and the oppositely disposed abutting surface 82. Roller 31, track 36 and catch 47 will be in their solid line positions as shown in Figure 1, with hook 49 holding track 36 in its operative position against stop 41. Locking member 67 will be in its locking position shown in dot-dash lines, preventing operative movement of outside rollback 52. Upon insertion of the key in the lock, key shaft 73 will be rotated to lower slide 76 into its dashed-line position of Figure 2. Locking member 67 will be rotated clockwise into its dashed-line position of Figure 1.

The operator may now swing outside rollback 52 clockwise into the dot-dash position of Figure 1. Offset 58 of the rollback will engage shoulder 51 of catch 47, rotating the catch into its dot-dash position. Hook 49 will be withdrawn from shoulder 38, permitting track 36 to rotate counterclockwise against the action of spring 42. It should be noted at this point that the force required to release track 36 is relatively slight because of the small engaging surfaces on hook 49 and shoulder 38, and the fact that no wedging forces need be overcome.

The door may now be opened, carrying the entire bolt assembly to the left as seen in Figure 1. Bolt 25 will be rotated clockwise by the keeper, forcing roller 31 to the left. At their extreme retracted positions roller 31 and track 36 will be in their dot-dash positions of Figure 1 at which point the roller will pass over the end of tooth 46. During this time hook 49 will ride on the surface 83 of track 36 and will not interfere with the track movement. End 35 of spring 33 is of sufficient length to support roller 31 in its retracted position.

When tooth 46 passes roller 31 the latter, as well as track 36, will be urged back into their solid line positions by spring 42. Since rollback 52 will ordinarily be actuated only momentarily, hook 49 will snap into position behind shoulder 38 as soon as track 36 is returned to its operative position. However, even if the operator holds catch 47 in retracted position after track 36 is returned, hook 49 will effectively engage the track as soon as rollback 52 is released.

After getting into the car the operator will close the door, moving the bolt assembly to the right as seen in Figure 1. As bolt 25 engages the striker portion of keeper 20 it will be rotated counterclockwise. This will cause roller 31 to move downwardly, which it is free to do against the action of spring 33. It will be noted that this movement is the same whether or not catch 47 is in its track-retaining position. After a tooth 30 of bolt 25 rides over roller 31, the latter will be forced into wedging position between the back of this tooth and track 36. Roller 31 will thus act as a dog or detent, and will also perform the take-up functions described above and in the aforementioned copending application. Of course, the dogging and take-up functions of roller 31 cannot take place until track 36 is held in its operative position by catch 47.

After the door is latched, the operator may lock it from the inside by rotating inside rollback 54 in a clockwise direction as seen in Figure 2. This will serve to swing locking member 67 into its locking position, preventing actuation of outside rollback 52. If it is desired to open the door from the inside, inside rollback 54 is rotated counterclockwise in Figure 2, retracting catch 47 in the same manner as previously described. If locking member 67 is in its locking position, it will be unlocked by engagement of rollback arm 66 with arm 71.

Figures 5 and 6 show another embodiment of the invention comprising a latching mechanism adapted for the rear doors of automotive vehicles. The device is similar to that shown in Figures 1–4 and differs therefrom mainly in that there is no provision for key-actuated locking or for kick-off by slamming the door. As shown, the device comprises a mounting plate generally indicated at 84 which has a base portion 85 and a flange portion 86. A bolt 87 is rotatably supported by means of a deck plate (not shown) and an outboard bearing member 88. A roller 89 and a track 91 are disposed adjacent bolt 87 and cooperate therewith in the same manner as the previous embodiment. A catch 92 is pivoted at 93 to base 85, the pivot also supporting an outside rollback 94. Catch 92 is adapted to engage track 91 and is retractable by outside rollback 94. An inside rollback 95 is pivotally mounted on flange 86 and is also engageable with catch 92 to withdraw it from engagement with the track.

A locking member 96 is pivotally supported by base 85 and is movable from an unlocking position shown in Figure 5 counterclockwise to a locking position. Outside rollback 94 is provided with an apertured portion so that the rollback clears member 96 when the latter is in its unlocking position. An arm 98 on inside rollback 95 serves to move member 96 to its unlocking position when the rollback is moved to unlatch the bolt. Clockwise movement of rollback 95 in Figure 6 will move member 96 to its locking position.

Since the elements of the embodiment of Figures 5 and 6 are closely similar to and operate in the same manner as the corresponding elements in the first embodiment, it is not believed necessary to describe their operation in detail. As in the previous embodiment, the bolt may be latched easily and will receive a continuous take-up force by roller 89. Unlatching is accomplished with little effort by either the inside or outside rollbacks.

Figures 7 and 8 show a third embodiment of the invention which is generally similar to that of Figures 1–4 but incorporates an outside rollback of a slidable type rather than a pivoted member. A mounting plate generally indicated at 99 comprises a base 101 and a flange 102, a bolt 103 being pivotally supported thereon. A roller 104 is engageable with bolt 103, the dogging teeth of the bolt in this case being offset from the latching teeth. A track 105 is pivotally mounted at 106 on base 101 and is urged by a spring 107 toward its operative position. A catch 108 is pivotally mounted at 109 on base 101 and is engageable with track 105.

Catch 108 is provided with an upwardly extending arm 111 which is engageable by an outside rollback 112. This rollback comprises an elongated member which is slidably mounted at the upper portion of base 101 by pins 113 and 114. The rollback has an abutting surface 115 engageable with arm 111 of catch 108 to swing the latter into its release position. The catch is also provided with an arm 116 engageable by an arm 117 on an inside rollback 118, the latter being pivotally mounted on flange 102. As in the previous embodiments, the inside and outside rollbacks are independently movable to retract catch 108.

The locking means of this embodiment comprises a locking slide 119 mounted on flange 102, the slide having a blocking portion 121 capable of being positioned in the path of a surface 122 of outside rollback 112. When in its unlocking position as shown in dotted lines of Figures 7 and 8, slide 119 is clear of the path of movement of the outside rollback. The means for moving slide 119 into its locking position comprises arm 117 of inside rollback 118. This arm is disposed underneath a tab 123 of slide 119 so that clockwise movement of rollback 118 in Figure 8 will move slide 119 upwardly into locking position. A key-actuatable lever 124 is pivoted at 125 to base 101 and has an extension 126 passing through an aperture 127 in the lower end of slide 119. Rocking movement of lever 124 in a counterclockwise direction as seen in Figure 7 will move the slide into its locking position. Lever 124 is also provided with an arm 128 positionable in the path of the dogging teeth of bolt 103 when the lever is moved counterclockwise. This arm has a kick-off function and will serve to move slide 119 into unlocking position when the door is slammed.

The operation of the embodiment of Figures 7 and 8 is similar to that of the previous embodiments and need not be described in detail. The slidable nature of outside rollback 112 will not detract from the ease of unlatching, since the forces required to disengage catch 108 from track 105 are relatively small.

Figures 9–11 show another embodiment of the invention in the form of a latch especially adapted for automobile hoods and similar installations. While this device incorporates the basic features and principles of the invention it does not include any means for locking the mechanism against unlatching. A housing 129 is provided for supporting the bolt assembly, this housing having a flange 131 for attachment to a stationary portion of the vehicle. A vertical recess 132 is provided in housing 129 for the reception of a keeper 133 secured to the hood (not shown). A bolt 134 is pivotally supported at 135 within housing 129 and has teeth projecting into recess 132 for engagement with the keeper. In the present embodiment only a single set of teeth are provided on bolt 134, these teeth serving the dual function of engaging the keeper and providing dogging surfaces for the roller. Roller 136 is carried within housing 129 by means of a spring 137 which has one end passing through the roller aperture and the other end secured to the housing. Spring 137 continually urges the roller in a downward direction toward the dotted line position of Figure 9. A track 138 is pivotally mounted at 139 and has a surface engageable by roller 136, so that the roller performs the dogging and take-up functions described with respect to the previous embodiments. A spring 141 engages an arm 142 of track 138 and urges the track into its operative position against roller 136. A catch comprising a lever 143 is pivoted at 144 and has a hook portion 145 engageable with track 138 to retain the latter in its operative position. A handle 146 is provided at the outer end of catch 143 for swinging the latter into its release position. A spring 147 mounted in housing 129 engages catch 143 and urges it into its engaging position with respect to track 138.

In operation of the embodiment shown in Figures 9–11, it will be assumed that the hood is latched and an operator wishes to open and then close the hood. The initial position of the parts will be as shown in solid and dotted lines in Figure 9, track 138 being retained in operative position by catch 143. Manual engagement of handle 146 by the operator to swing catch 143 into its dot-dash line position will result in the freeing of track 138. The hood to which keeper 133 is secured may then be lifted, the keeper rotating bolt 134 in a counterclockwise direction. This will force roller 136 to the left into the retracted dot-dash position, track 138 also moving to this position. Should handle 146 be released during this time, the upper surface of catch 143 will engage the underside of track 138 but will not interfere with the delatching movement. As soon as a tooth has passed roller 136 the latter will be forced back into its dotted line position by spring 137. Track 138 will follow this movement and will be retained in operative position by catch 143.

When the hood is again lowered, keeper 133 will enter opening 132 and will rotate bolt 134 in a clockwise direction. Roller 136 will move upwardly into its double dot-dash line position under the influence of this bolt rotation, and when the bolt tooth has passed the roller, the latter will again be urged downwardly by spring 137. The roller will thereafter assume its dogging and take-up functions in the same manner as the previous embodiments. In view of the three extreme positions which roller 136 assumes during a cycle of operation, a clearance aperture 148 is provided in housing 129 for the end 149 of spring 137 which passes through the roller.

While it will be apparent that the preferred embodiments of the invention herein disclosed are well calculated to fulfill the objects above stated, it will be appreciated that the invention is susceptible to modifications, variation and change without departing from the proper scope or fair meaning of the subjoined claims.

What is claimed is:

1. In a latch mechanism, a mounting plate, a multi-toothed bolt rotatably mounted on said plate, dogging means for said bolt comprising a roller engageable with said bolt teeth, a track carried by said plate and movable between an operative and a retracted position, said track when in its operative position being engageable by said roller, resilient means urging said roller toward one end of said track whereby the roller wedgingly engages said bolt to urge the bolt in a latching direction, a catch mounted adjacent said track, said catch being movable between a retaining position holding said track in its operative position and a release position permitting movement of said track to its retracted position, and manually operable means for moving said catch to its release position.

2. In a latching mechanism, a rotary multi-toothed bolt, dogging means for said bolt comprising a movable roller engageable with individual bolt teeth, a track adjacent said roller and movable between an operative position and a retracted position, resilient means urging said roller toward one end of said track, the track when in its operative position being so inclined relative to the tooth engaged by said roller that the roller wedgingly engages said bolt to urge it in a latching direction, a catch movable between a retaining position holding said track in its operative position and a release position permitting movement of said track to its retracted position, resilient means urging said catch into its retaining position, and manually operable means for moving said catch to its release position.

3. In a latching mechanism, a rotary multi-toothed bolt, dogging means for said bolt comprising a movable roller engageable with individual bolt teeth, a track adjacent said roller and movable between an operative position and a retracted position, resilient means urging said roller toward one end of said track, the track when in its operative position being so inclined relative to the tooth engaged by said roller that the roller wedgingly engages said bolt to urge it in a latching direction, said roller being in the path of movement of the advancing teeth of said bolt when the latter is rotated in a latching direction by outside means, whereby said roller is adapted to be forced into retracted position against the action of said resilient means, a catch movable between a retaining position holding said track in its operative position and a release position permitting movement of said track to its retracted position, resilient means urging said catch into its retaining position, and manually operable means for moving said catch to its release position.

4. In a latching mechanism, a rotary multi-toothed bolt, dogging means for said bolt comprising a movable roller engageable with individual bolt teeth, a track adjacent said roller and movable between an operative position and a retracted position, resilient means urging said roller toward one end of said track, the track when in its operative position being so inclined relative to the tooth engaged by said roller that the roller wedgingly engages said bolt to urge it in a latching direction, resilient means urging said track into its operative position, a catch movable between a retaining position holding said track in its operative position and a release position permitting movement of said track to its retracted position, resilient means urging said catch into its retaining position, and manually operable means for moving said catch to its release position.

5. In a latching mechanism, a mounting plate, a multi-toothed bolt rotatably supported by said mounting plate, dogging means for said bolt comprising a movable roller engageable with individual bolt teeth, a track carried by said mounting plate adjacent said roller and movable between an operative position and a retracted position, resilient means urging said roller toward one end of said track, the track when in its operative position being so inclined relative to the tooth engaged by said roller that the roller wedgingly engages said bolt to urge it in a latching direction, the roller being in the path of movement of the advancing teeth of said bolt when rotated by an outside force in a latching direction, whereby said roller is adapted to be forced into retracted position, resilient means urging said track toward its operative position, a catch carried by said mounting plate, said catch being movable between a retaining position holding said track in its operative position and a release position permitting movement of said track to its retracted position, resilient means urging said catch into its retaining position, and manually operable means for moving said catch to its release position, whereby rotation of said bolt by an outside force in an unlatching direction will cause retraction of said roller and said track.

6. The combination according to claim 5, said track and said catch being supported by said mounting plate for pivotal movement about separate axes.

7. In a latching mechanism, a rotary multi-toothed bolt, dogging means for said bolt comprising a movable roller engageable with individual bolt teeth, a track pivoted adjacent said roller and movable between an operative position and a retracted position, resilient means urging said roller toward one end of said track, the track when in its operative position being so inclined relative to the tooth engaged by said roller that the roller wedgingly engages said bolt to urge it in a latching direction, resilient means urging said track into its operative position, a catch movable between a retaining position holding said track in its operative position and a release position permitting movement of said track to its retracted position, resilient means urging said catch into its retaining position, and manually operable means for moving said catch to its release position, whereby rotation of said bolt in an unlatching direction by an outside force will cause retraction of said roller and track.

8. In a latching mechanism, a rotary multi-toothed bolt, dogging means for said bolt comprising a movable roller engageable with individual bolt teeth, a track adjacent said roller and movable between an operative position and a retracted position, resilient means urging said roller toward one end of said track, the track when in its operative position being so inclined relative to the tooth engaged by said roller that the roller wedgingly engages said bolt to urge it in a latching direction, a catch pivotally movable between a retaining position holding said track in its operative position and a release position permitting movement of said track to its retracted position, resilient means urging said catch into its retaining position, and manually operable means for moving said catch to its release position.

9. In a door latching mechanism, a mounting plate, a rotary multi-toothed bolt carried by said mounting plate, dogging means comprising a roller movably mounted adjacent said bolt and engageable with individual bolt teeth, a track carried by said mounting plate and movable between an operative and a retracted position, resilient means urging said roller toward one end of said track, the track when in its operative position being so inclined relative to a tooth engaged by said roller that said bolt is wedgingly engaged in a latching direction, resilient means urging said track toward its operative position, a catch carried by said mounting plate and movable between a retaining position holding said track in its operative position and a release position permitting movement of said track toward its retracted position, resilient means urging said catch toward its retaining position, an outside rollback carried by said mounting plate and engageable with said catch to move the latter toward its release position, and an inside rollback carried by said mounting plate, said inside rollback being engageable with said catch independently of said outside rollback to move the catch toward its release position.

10. In a door latching mechanism, an angular mounting plate having a base and a flange, a rotary multi-toothed bolt carried by said mounting plate, dogging means comprising a roller movably mounted adjacent said bolt and engageable with individual bolt teeth, a track carried by said mounting plate and movable between an operative and a retracted position, resilient means urging said roller toward one end of said track, the track when in its operative position being so inclined relative to a tooth engaged by said roller that said bolt is wedgingly engaged in a latching direction, resilient means urging said track toward its operative position, a catch carried by said mounting plate and movable between a retaining position holding said track in its operative position and a release position permitting movement of said track toward its retracted position, resilient means urging said catch toward its retaining position, an outside rollback carried by said base and engageable with said catch to move the latter toward its release position, and an inside rollback carried by said flange, said inside rollback being engageable with said catch independently of said outside rollback to move the catch toward its release position.

11. In a door latching mechanism, a mounting plate, a rotary multi-toothed bolt carried by said mounting plate, dogging means comprising a roller movably mounted adjacent said bolt and engageable with individual bolt teeth, a track carried by said mounting plate and movable between an operative and a retracted position, resilient means urging said roller toward one end of said track, the track when in its operative position being so inclined relative to a tooth engaged by said roller that said bolt is wedgingly engaged in a latching direction, resilient means urging said track toward its operative position, a catch carried by said mounting plate and movable between a retaining position holding said track in its operative position and a release position permitting movement of said track toward its retracted position, resilient means urging said catch toward its retaining position, an outside rollback carried by said mounting plate and engageable with said catch to move the latter toward its release position, an inside rollback carried by said mounting plate, said inside rollback when moved in one direction being engageable with said catch independently of said outside rollback to move the catch toward its release position, and means actuatable by movement of said inside rollback in the opposite direction for locking said outside rollback against operative movement.

12. In a door latching mechanism, a mounting plate, a rotary multi-toothed bolt carried by said mounting plate, dogging means comprising a roller movably mounted adjacent said bolt and engageable with individual bolt teeth, a track pivoted to said mounting plate and movable between an operative and a retracted position, resilient means urging said roller toward one end of said track, the track when in its operative position being so inclined relative to a tooth engaged by said roller that said bolt is wedgingly engaged in a latching direction, resilient means urging said track toward its operative position, a catch pivoted to said mounting plate and movable between a retaining position holding said track in its operative position and a release position permitting movement of said track toward its retracted position, resilient means urging said catch toward its retaining position, an outside rollback carried by said mounting plate and engageable with said catch to move the latter toward its release position, and an inside rollback carried by said mounting plate, said inside rollback being engageable with said catch independently of said outside rollback to move the catch toward its release position.

13. In a door latching mechanism, a mounting plate, a rotary multi-toothed bolt carried by said mounting plate, dogging means comprising a roller movably mounted adjacent said bolt and engageable with individual bolt teeth, a track carried by said mounting plate and movable between an operative and a retracted position, resilient means urging said roller toward one end of said track, the track when in its operative position being so inclined relative to a tooth engaged by said roller so that said bolt is wedgingly engaged in a latching direction, resilient means urging said track toward its operative position, a catch pivoted to said mounting plate and movable between a retaining position holding said track in its operative position and a release position permitting movement of said track toward its retracted position, resilient means urging said catch toward its retaining position, an outside rollback carried by said mounting plate on a pivot common with said catch and engageable with said catch to move the latter toward its release position, and an inside rollback carried by said mounting plate, said inside rollback being engageable with said catch independently of said outside rollback to move the catch toward its release position.

14. In a door latching mechanism, an angular mounting plate having a base and a flange, a multi-toothed bolt rotatably mounted on said base, dogging means comprising a roller adjacent said bolt, a track pivoted to said base and movable between an operative and a retracted position, resilient means urging said roller toward one end of said track, the track being so inclined relative to a tooth engaged by said roller as to cause said bolt to be wedgingly engaged in a latching direction, a catch pivotally mounted on said base and movable between a retaining position holding said track in its operative position and a release position permitting movement of said track toward its retracted position, resilient means urging said catch toward its retaining position, an outside rollback carried by said base on a common pivot axis with said catch, mutually engaging surfaces on said catch and outside rollback whereby the catch is movable by said outside rollback toward its release position, an inside rollback pivotally mounted on said flange, mutually engaging surfaces on said catch and inside rollback whereby the catch is movable toward its release position by said inside rollback independently of said outside rollback, a blocking member pivotally mounted on said base and movable between a locking position blocking operative movement of said outside rollback and an unlocking position permitting such movement, and mutually engaging surfaces on said inside rollback and blocking member whereby said blocking member is movable by said inside rollback between its locking and unlocking positions.

15. In a door latching mechanism, an angular mounting plate having a base and flange, a rotary multi-toothed bolt carried by said mounting plate, dogging means comprising a roller movably mounted adjacent said bolt and engageable with individual bolt teeth, a track pivoted to said base and movable between an operative and a retracted position, resilient means urging said roller toward one end of said track, the track when in its operative position being so inclined relative to a tooth engaged by said roller that said bolt is wedgingly engaged in a latching direction, resilient means urging said track toward its operative position, a catch pivoted to said base and movable between a retaining position holding said track in its operative position and a release position permitting movement of said track toward its retracted position, resilient means urging said catch toward its retaining position, an outside rollback slidably mounted on said base and engageable with said catch to move the latter toward its release position, and an inside rollback carried by said mounting plate, said inside rollback being engageable with said catch independently of said outside rollback to move the catch toward its release position.

16. In a door latching mechanism, an angular mounting plate having a base and flange, a rotary multi-toothed bolt carried by said mounting plate, dogging means comprising a roller movably mounted adjacent said bolt and engageable with individual bolt teeth, a track pivoted to said base and movable between an operative and a retracted position, resilient means urging said roller toward one end of said track, the track when in its operative position being so inclined relative to a tooth engaged by said roller that said bolt is wedgingly engaged in a latching direction, resilient means urging said track toward its operative position, a catch pivoted to said base and movable between a retaining position holding said track in its operative position and a release position permitting movement of said track toward its retracted position, resilient means urging said catch toward its retaining position, an outside rollback slidably mounted on said base and engageable with said catch to move the latter toward its release position, an inside rollback carried by said mounting plate, said inside rollback being engageable with said catch independently of said outside rollback to move the catch toward its release position, a blocking member mounted on said flange and movable between a locking position blocking operative movement of said outside rollback and an unlocking position permitting such movement, means on said inside rollback for moving said blocking member to its locking position, key-actuatable means carried by said base for moving said blocking member to its locking position independently of said inside rollback, and kick-off means engageable by said bolt when rotated in a latching direction by an outside force for moving said blocking member to its unlocking position.

17. In a latching mechanism, a housing having a recess therein for the reception of a keeper, a multi-toothed bolt rotatably carried by said housing and having teeth projectable into said recesses to engage said keeper, dogging means comprising a roller adjacent said bolt and engageable with individual teeth thereof, a track pivotally mounted adjacent said roller and movable between an operative position and a retracted position, resilient means urging said track toward its operative position, resilient means urging said roller toward one end of said track, the track when in its operative position being so inclined relative to a tooth engaged by said roller as to produce a wedging action on said bolt in a latching direction, a catch comprising a lever pivoted adjacent said track and movable between a retaining position holding said track in its operative position and a release position permitting retracting movement of said track, resilient means urging said lever toward its retaining position, and a handle at one end of said lever for moving the latter to its release position.

18. In a bolt assembly, an angular mounting plate having a base and a flange, a multi-toothed bolt on said base, a dogging member for said bolt movable between an unlatching position away from said bolt and a latching position in dogging relation with said bolt, a reaction member movably mounted on said base adjacent said dogging member and movable between a retracted position and an operative position supporting said dogging member in its latching position, a lever pivoted on said base, a first arm on said lever having a catch engageable with said reaction member, an outside rollback movably mounted on said base and having a portion engageable with said lever in one direction of movement, a second arm on said lever extending toward said flange, an inside rollback movably mounted on said flange and engageable with said second lever arm, the lever being rotatable independently by said outside and inside rollbacks from a holding position in which said catch maintains said reaction member in its operative position to a releasing position with respect to said reaction member, and a locking member carried by said mounting plate and movable between an unlocking position and a locking position in obstructing relation with said outside rollback, whereby the outside rollback is prevented from moving said lever to its releasing position.

19. The combination according to claim 18, further provided with a kick-off lever carried by said mounting plate and movable between a first position in the path of rotation of said multi-toothed bolt and a kick-off position out of said path, and a connection between said locking member and said kick-off member whereby said locking member will be moved to its unlocking position when the bolt is rotated with the kick-off member in its first position.

20. The combination according to claim 18, said outside rollback being pivotally mounted on the same pivot as said lever and having a portion movable toward said flange when moved in an unlatching direction, said locking member comprising a lever pivoted on said base and having a portion movable into the path of said outside rollback portion.

References Cited in the file of this patent

UNITED STATES PATENTS 2,394,646   Wagner ---------------- Feb. 12, 1946